United States Patent [19]

Wetrich et al.

[11] 4,318,305
[45] Mar. 9, 1982

[54] SYNCHRONIZED TRANSMISSION

[75] Inventors: Peter D. Wetrich, Cedar Falls; Gordon L. Marquart, Jesup, both of Iowa; Volker D. Hückler, Mannheim; Vasile A. Benedek, Brühl, both of Fed. Rep. of Germany

[73] Assignee: Deere & Company, Moline, Ill.

[21] Appl. No.: 27,156

[22] Filed: Apr. 4, 1979

[51] Int. Cl.³ .......................... F16H 3/38; F16H 3/08
[52] U.S. Cl. ...................................... 74/339; 74/357; 74/359; 74/701
[58] Field of Search ................. 74/357, 358, 359, 360, 74/740, 694, 339, 701

[56] References Cited

U.S. PATENT DOCUMENTS

| | | | |
|---|---|---|---|
| 2,355,626 | 8/1944 | Bullard et al. | 74/359 X |
| 2,506,670 | 5/1950 | Kamlukin | 74/359 |
| 3,285,088 | 11/1966 | Atsumi et al. | 74/359 |
| 4,106,364 | 8/1978 | Zenker et al. | 74/740 |

Primary Examiner—C. J. Husar
Assistant Examiner—Frank McKenzie
Attorney, Agent, or Firm—Fraser and Bogucki

[57] ABSTRACT

A tractor transmission is synchronized between four different speeds in each of two different high and low ranges and a reverse range. A top shaft coupled to be driven by the tractor engine has four different gears which are concentrically and rotatably spaced along the length thereof in constant mesh with a different one of a second group of four gears formed on the outer surface of a counter shaft. The counter shaft is selectively coupled to the top shaft by either of two pairs of synchronizers concentrically mounted on the top shaft between different pairs of the first four gears. High and low ranges are respectively provided by a first splined collar capable of coupling the counter shaft directly to a differential drive shaft and a second splined collar capable of coupling the differential drive shaft to the fourth gear disposed about the top shaft via a low range driven gear. Upon loss of hydraulic fluid pressure, a planetary gear arrangement coupled between the top shaft and the tractor engine is automatically returned from a direct drive condition to an underdrive condition by mechanical springs within two different clutches associated therewith. Similar safety features are provided in connection with the front wheel drive portion of the transmission.

16 Claims, 7 Drawing Figures

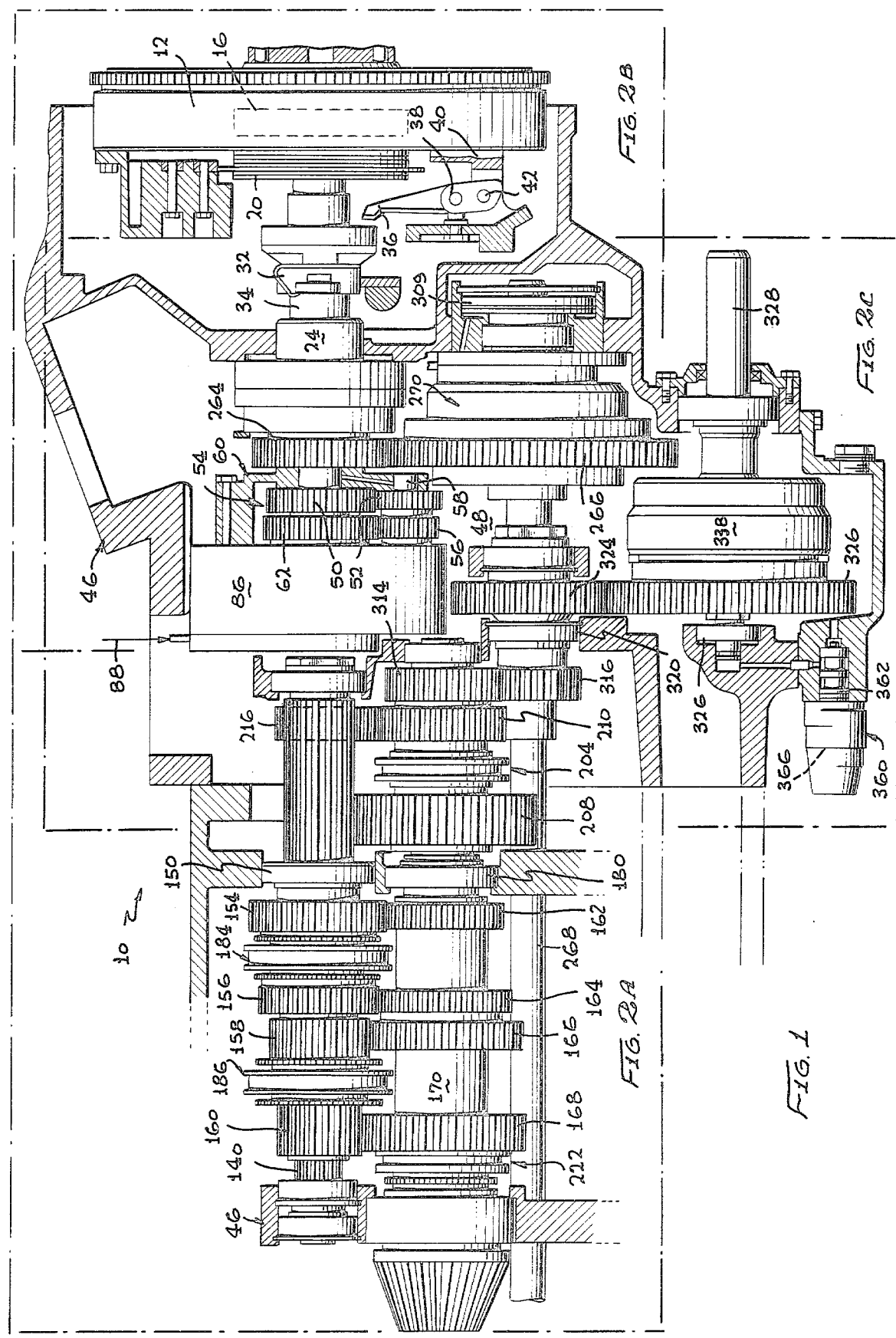

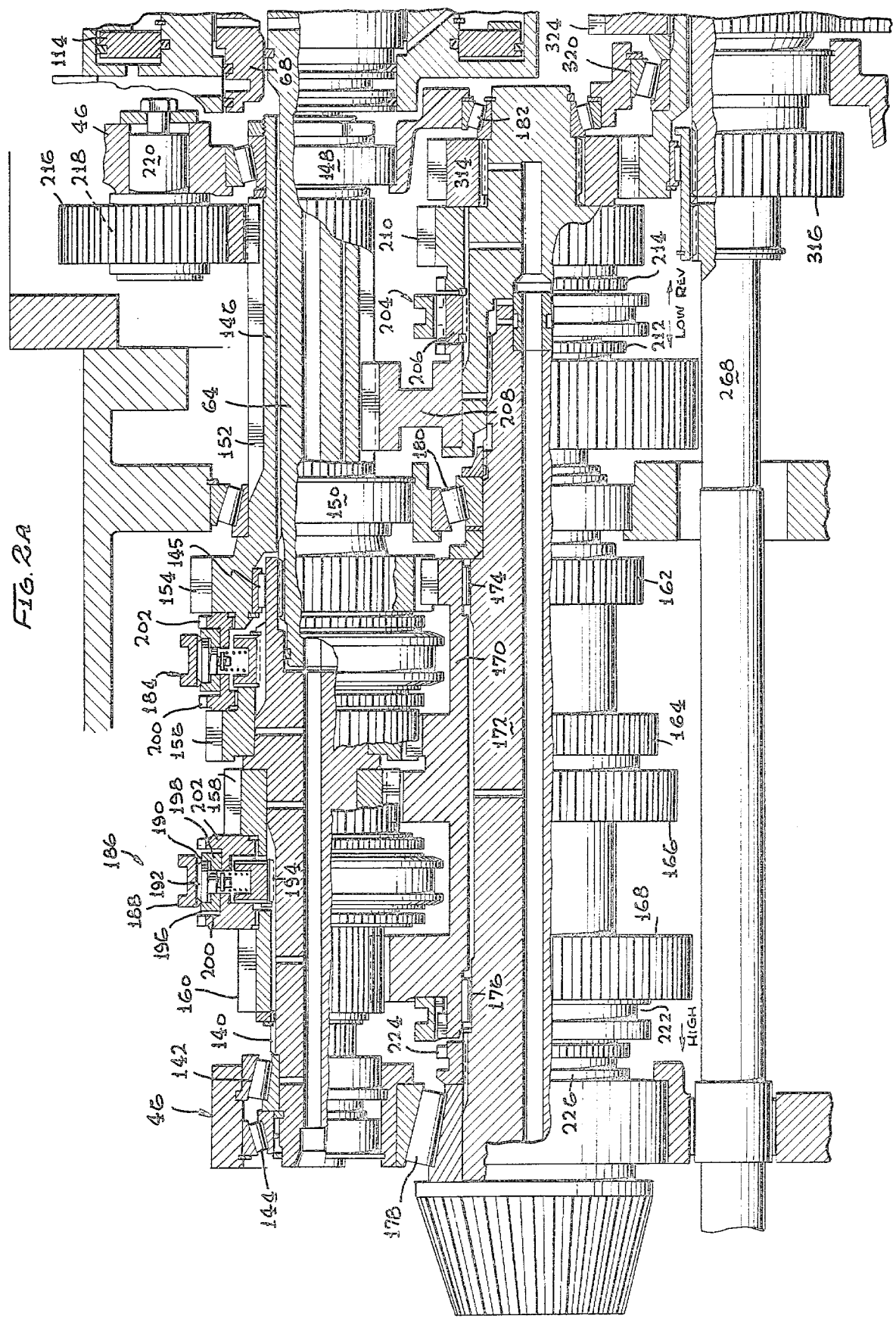

SYNCHRONIZED TRANSMISSION

BACKGROUND OF THE INVENTION

1. Field of the Invention

The present invention relates to transmissions, and more particularly to tractor transmissions having different speed ranges including direct and underdrive coupling, and connections for power takeoff and front wheel drives.

2. History of the Prior Art

Transmissions for tractors and similar agricultural vehicles are desirably provided with a substantial variety of different speeds and speed ranges to accommodate the varying conditions under which such vehicles must operate. To be both versatile and efficient, tractors must be capable of operating at a wide range of speeds to accommodate a variety of different agricultural operations while at the same time being able to select a speed within a small, critical range for a given operation or set of conditions so as to be able to operate efficiently.

An example of a tractor transmission is provided by U.S. Pat. 3,774,474 of Recker et al, issued Nov. 27, 1973 and commonly assigned with the present application. The transmission described in the Recker et al patent provides for sixteen different speeds or gear ratios through use of a planetary section coupled between the engine and input shaft, a second clutch-operated section coupling the input shaft to a counter shaft and capable of being shifted between high and low speed ranges and a third section coupled between the counter shaft and an output shaft. The third section utilizes two different clutches in conjunction with four sets of gearing to provide a basic set of four speeds. The second section combines with the four speed third section to provide eight different speeds, with the eight speeds being extended to sixteen by the planetary section which can be shifted between direct drive and underdrive conditions.

Other examples of tractor transmissions are provided by U.S. Pats. No. 3,682,019 of Hoyer et al, No. 3,106,273 of Doerfer et al, No. 3,149,498 of Mack, No. 2,998,732 of Nelson, No. 2,747,416 of Swenson et al, No. 2,871,726 of Kamlukin, No. 2,880,833 of Stevenson et al, No. 2,982,153 of Albertson et al, No. 3,065,643 of Mark et al, No. 3,589,483 of Smith, No. 3,251,243 of Kress and No. 3,274,858 of Meyer et al.

Tractor transmissions of the type shown by the above-identified patents are typically provided with various driving connections in addition to the basic driving connection to the rear wheels of the tractor. Such additional connections may include a power takeoff connection and a mechanical front wheel drive connection. The power takeoff connection typically includes a power takeoff shaft which may be coupled to drive various agricultural implements and which is driven from the main part of the transmission through appropriate gearing and a clutch which controls coupling of the power takeoff shaft to the transmission. The mechanical front wheel drive connection also couples the main part of the transmission through appropriate gearing and a connect-disconnect clutch to a front wheel drive shaft. The front wheel drive shaft couples to the front wheels of the tractor through an appropriate axle and universal joint coupling.

Presently known tractor transmissions suffer from a number of limitations which may impair their efficiency in general and their usefulness for certain applications. One such problem arises from the difficulty in providing synchronized shifting between the different gears, particularly in arrangements where the components are to be compactly and efficiently arranged. The inability to shift smoothly and synchronously between different closely spaced speeds as load conditions change may require at the very least double clutching or at the extreme that the tractor be brought to rest before the gears can be changed. Another serious problem stems from the fact that clutches in the planetary section as well as in the front wheel drive sections are typically hydraulically operated. A potentially damaging situation exists when hydraulic pressure is reduced due to leakage or malfunction or completely lost in cases such as where the engine stalls or cannot be started. If the tractor is stalled or stopped with the planetary section in the high or direct drive condition in which the rotatable carrier housing the planetary gears is coupled to the input shaft from the engine, it may be impossible to tow start the tractor without running the risk of serious damage to the transmission. The loss of hydraulic fluid pressure may allow the planetary carrier to remain coupled to the input shaft so as to rotate at extremely high speeds with the resultant danger to or destruction of the bearings therefor when the tractor is towed. Stoppage of the tractor with the two clutches of the planetary section in a plurality engaged condition may also result in damage or destruction of the frictional components of the clutches.

Further dangers exist in connection with the front wheel drive connections in the event of loss of hydraulic fluid pressure such as where the tractor engine stalls. For example, if the tractor is being backed up a hill with the clutch of the front wheel drive connection engaged to provide primary driving from the front wheels, and the engine suddenly stalls, the sudden loss of hydraulic pressure may result in partial or complete disengagement of the front wheel drive clutch and consequent reliance solely on the rear wheels to try to control the tractor as it quickly begins to slide back down the hill.

Accordingly, it is an object of the invention to provide a multirange transmission capable of synchronously shifting between a plurality of closely spaced speeds within each range using an arrangement of components which is relatively simple and efficient.

It is a further object of the invention to provide a transmission in which a planetary section automatically shifts into the low or underdrive condition with loss of hydraulic pressure.

It is a still further object of the invention to provide a transmission in which the mechanical front wheel drive engages upon loss of hydraulic fluid pressure.

BRIEF DESCRIPTION OF THE INVENTION

These and other objects are accomplished in accordance with the invention by a synchronized transmission arrangement in which a first plurality of gears are concentrically disposed for rotation in spaced-apart relation along a top shaft coupled to be driven by an engine. Each gear within the first plurality meshes with a different gear in a second plurality of gears at the outer periphery of an integrally formed counter shaft journaled for rotation about a differential drive shaft. A different pair of synchronizers mounted on the top shaft between each adjacent pair of gears in the first plurality of gears may be used to couple either of the gears to the top shaft in synchronized fashion to effect coupling of the top shaft to the counter shaft via the coupled gear.

In this manner the top shaft can be coupled to the counter shaft through any of a plurality of different gear ratios with each such ratio being defined by one of the gears of the first plurality of gears and its mating gear at the outer periphery of the counter shaft. In one example where four different gears comprise the first plurality of gears and are selectively coupled to the top shaft by either of two pairs of synchronizers, synchronous shifting between four different speeds is possible.

A low range for the different speeds provided by the first plurality of gears encircling the top shaft and the mating gears of the counter shaft is provided by a first collar splined onto the outer surface of the differential drive shaft and axially movable so as to engage a set of splines on a low drive driven gear concentrically disposed for rotation about the differential drive shaft and meshing with a separate portion of one of the first plurality of gears disposed about the top shaft. The first collar can also be moved in the opposite axial direction to engage a set of splines on a driven reverse gear concentrically disposed for rotation about the differential drive shaft. The driven reverse gear meshes with an intermediate reverse gear which in turn meshes with a different portion of one of the first plurality of gears surrounding the top shaft to provide a range of reverse speeds. A high range of speeds is provided by a second collar splined to the counter shaft at the opposite end thereof and axially movable so as to engage a set of splines on the outer surface of the counter shaft and thereby provide a direct coupling between the counter shaft and the differential drive shaft.

The top shaft is coupled to the tractor engine through a planetary section which includes a rotatable carrier having a planetary gear arrangement pivotably mounted on the inside thereof and meshing with an input sun gear mounted on a shaft coupled to the engine and an output sun gear mounted on the top shaft. Direct and underdrive conditions are provided by a pair of clutches, a first of which is operative to clamp the carrier to a stationary housing to provide the underdrive condition and the second of which is capable of coupling the carrier to the top shaft via the output sun gear to provide the direct drive condition. The first clutch which is hydraulically driven into disengagement includes a mechanical spring arranged to bias the friction rings of the clutch into engagement. The second clutch which includes an arrangement for hydraulically driving the clutch into engagement to achieve the direct drive condition also includes a mechanical spring arranged to bias the clutch into disengagement in the absence of hydraulic pressure. Thus, when hydraulic pressure to the first and second clutches is lost accidentally as well as intentionally, the planetary section is automatically shifted into the low or underdrive condition.

The differential drive shaft of the transmission may be coupled to drive the front wheels of the tractor through a drive gear mounted on the differential drive shaft, an intermediate gear meshed with the drive gear and journaled for free rotation about a power takeoff shaft and a driven gear meshed with the intermediate gear and which is coupled to a front wheel drive shaft through a clutch. The clutch which is disengaged by a hydraulically operated piston arrangement is engaged by the mechanical spring. In the absence of hydraulic pressure for either accidental or intentional reasons, the spring overcomes the piston arrangement and biases the friction rings of the clutch into an engaging position so as to couple the transmission to the front wheels via the front wheel drive shaft.

BRIEF DESCRIPTION OF THE DRAWINGS

FIG. 1 is a side elevational view of a transmission in accordance with the invention;

FIG. 2 comprising FIGS. 2A, 2B and 2C is a detailed longitudinal view of the transmission of FIG. 1;

DETAILED DESCRIPTION

Figure 2B:
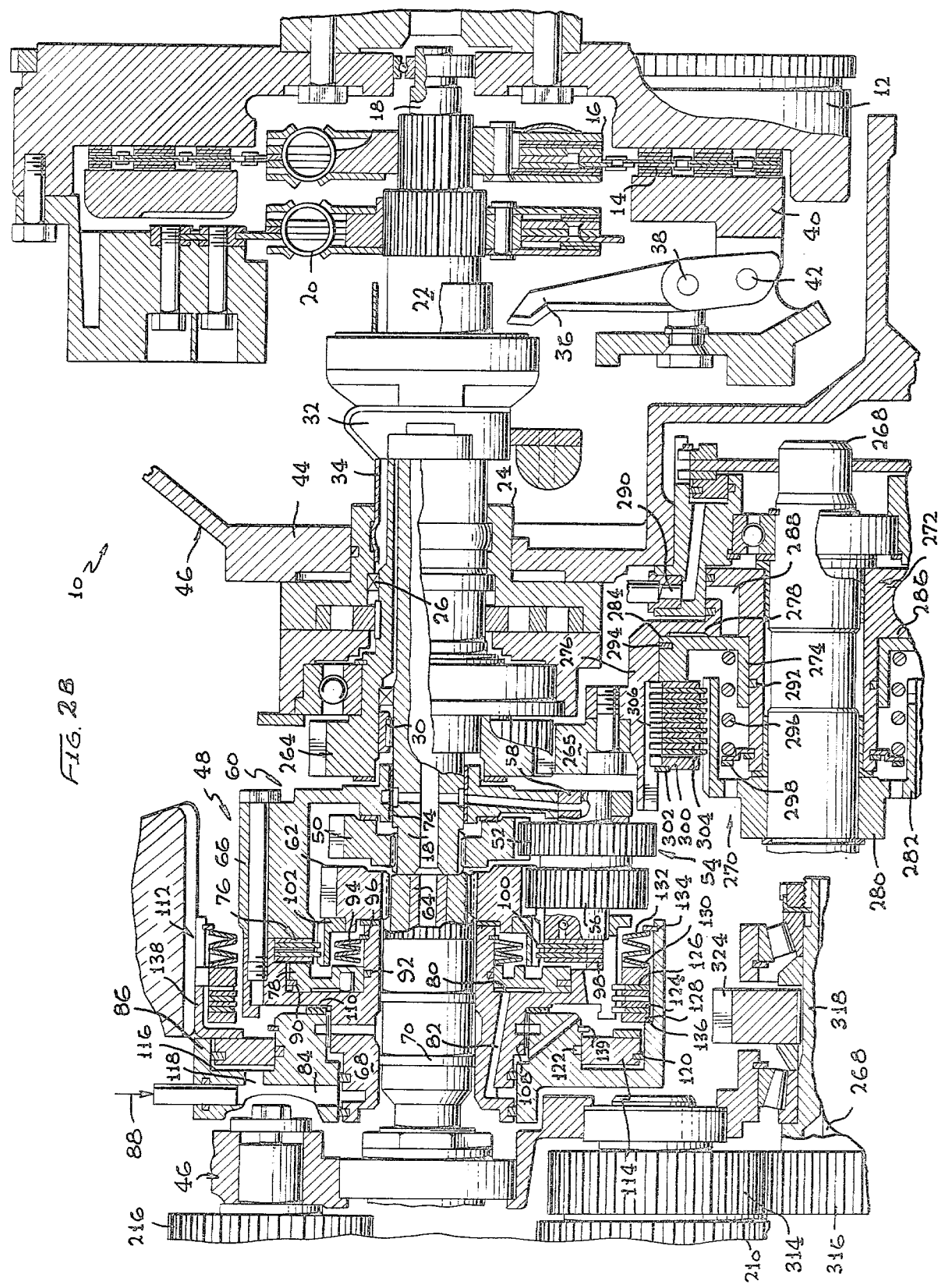
Figure 2C:
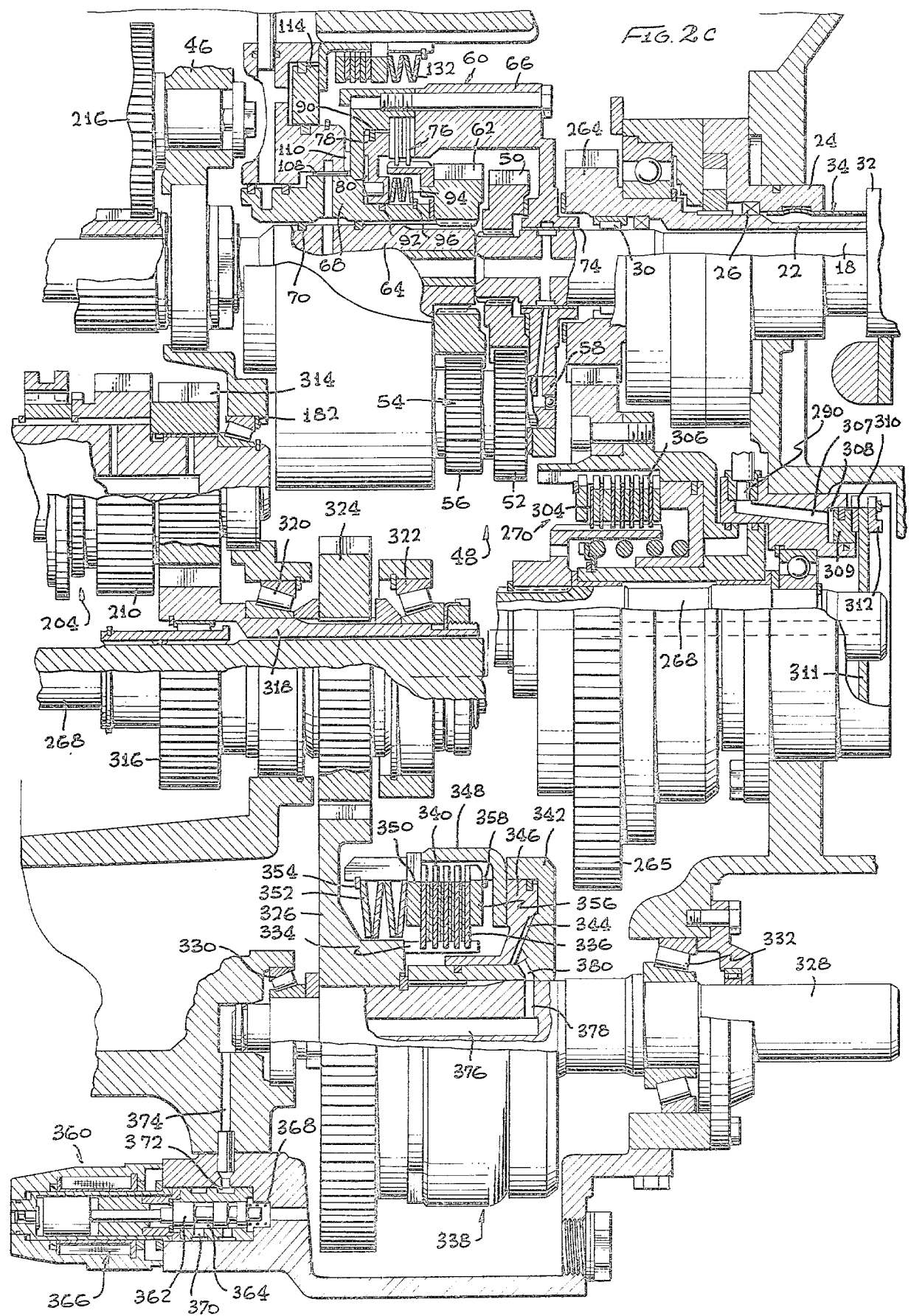
Figure 3:
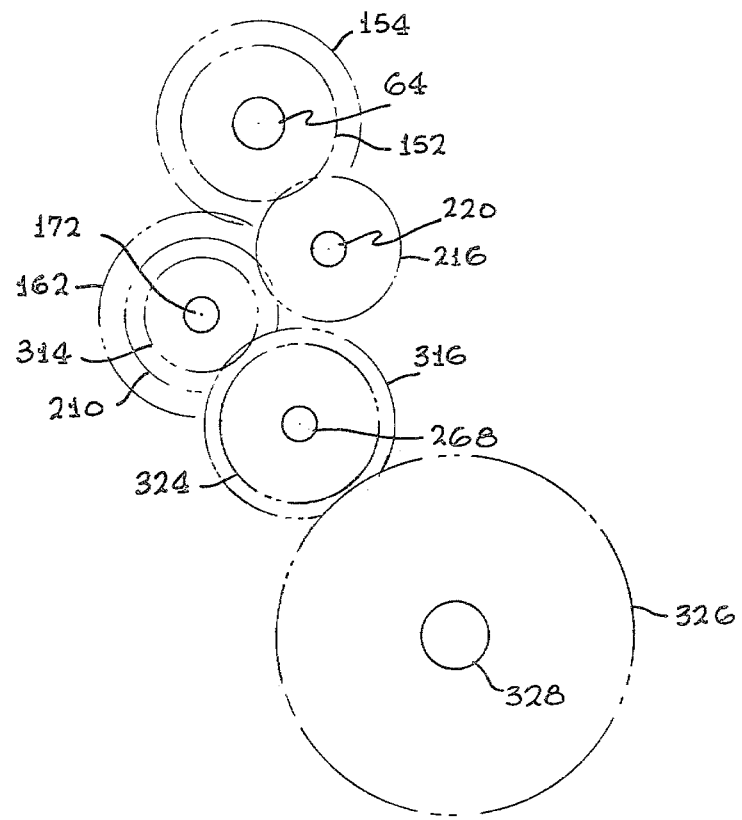
FIG. 3 is a transverse sectional view of the transmission of FIG. 1.

FIGS. 1–3 depict a synchronized transmission 10 in accordance with the invention. The transmission 10 includes a flywheel 12 coupled to be driven by an engine or other source of power. The flywheel 12 which is of conventional configuration is coupled through a clutch disk assembly 14 to a hub 16 splined to the outer surface of a traction clutch shaft 18. The flywheel 12 is also coupled to a power takeoff hub 20 which is splined to the outer surface of a hollow power takeoff drive shaft 22 concentrically disposed on the outside of and journaled for rotation about the traction clutch shaft 18. The power takeoff drive shaft 22 resides within and is coupled to a shaft mounting hub 24 by a bearing 26. The traction clutch shaft 18 is supported by the inner surface of the power takeoff drive shaft 22 via bearing 30.

The flywheel 12 is permanently coupled via the power takeoff hub 20 to the power takeoff drive shaft 22 so as to drive the shaft 22 whenever the flywheel 12 is driven by the engine. The flywheel 12 is normally coupled to the traction clutch shaft 18 via the hub 16 and the clutch disk assembly 14. However, the flywheel 12 can be uncoupled from the hub 16 and its included traction clutch shaft 18 by a throw-out bearing 32 mounted on a hollow cylindrical mounting member 34 which is concentrically disposed about and spaced apart from the power takeoff drive shaft 22 and which is mounted within the shaft mounting hub 24. The throw-out bearing 32 operates in conventional fashion and is capable of moving to the right as seen in FIG. 2 so as to engage and push a pivotably mounted lever 36. Rotational movement of the lever 36 which is pivotably mounted at a point 38 pulls a pressure plate 40 which is coupled to the lever 36 at a point 42 away from the clutch disk assembly 14 to uncouple the traction clutch shaft 18 from the flywheel 12. The shaft mounting hub 24 is mounted within a wall 44 of a housing 46 for the transmission 10.

The transmission 10 includes a planetary section 48 for providing direct drive and underdrive (high and low) conditions. The planetary section 48 includes an input sun gear 50 mounted on the outside of the traction clutch shift 18 at an end of the shaft 18 opposite the flywheel 12. The input sun gear 50, which has thirty-three teeth in the present example, permanently meshes with a twenty-one tooth first gear 52 of a planet gear arrangement 54. The planet gear arrangement 54 includes an eighteen tooth gear 56 integrally formed with the first gear 52. The planet gear arrangement 54 is mounted for rotation about a planetary spindle 58 mounted on an internal portion of a carrier 60 so that the central axis of the spindle 58 is parallel to the central axis of the traction clutch shaft 18. The eighteen tooth gear 56 is in constant mesh with a thirty-six tooth output sun gear 62 mounted on one end of an input shaft 64. The input shaft 64 is mounted for rotation about a common central axis shared by the traction clutch shaft 18.

The carrier 60 includes a forward portion 66 thereof which surrounds the sun gears 50 and 62 and which mounts the planet gear arrangement 54 via the planetary spindle 58. The carrier 60 also includes a rear portion 68 which is coupled to the forward portion 66 and which is also mounted for rotation about the input shaft 64. Rotation of the rear portion 68 of the carrier 60 relative to and about the outside of the input shaft 64 is provided for by a bearing 70. The forward portion 66 of the carrier 60 is mounted on the traction clutch shaft 18 for rotation relative thereto by a bearing 74.

The rear portion 68 of the carrier 60 partially houses a clutch 76 for controlling coupling of the carrier 60 to the input shaft 64 via the output sun gear 62. The clutch 76 includes a generally ring-shaped piston 78 coaxially disposed relative to the input shaft 64 and partially disposed within a mating cavity 80 in the rear portion 68 of the carrier 60. The cavity 80 communicates via a passage 82 in the rear portion 68 and a passage 84 within a stationary low brake housing 86 to a source 88 of pressurized hydraulic fluid. The cavity 80 behind the piston 78 is sealed by outer and inner seals 90 and 92 respectively extending between the piston 78 and the walls of the cavity 80 formed by the rear portion 68 of the carrier 60. The piston 78 is axially movable relative to the input shaft 64 in response to pressurized hydraulic fluid applied to the cavity 80 via the passages 84 and 82 from the source 88. Application of pressurized hydraulic fluid to the cavity 80 tends to push the piston 78 to the right as seen in FIG. 2 against the resistance of a resilient element in the form of a ring-shaped spring 94 surrounding an inner part of the rear portion 68 of the carrier 60. The spring 94 is mounted so that one side thereof abuts the piston 78 and the other side thereof abuts a stop ring 96 seated within the rear portion 68. The spring 94, which comprises a Belleville spring in the present example, is compressed by movement of the piston 78 to the right as seen in FIG. 2 in response to admission of pressurized hydraulic fluid into the cavity 80. Upon removal of the pressurized hydraulic fluid, the piston 78 moves to the left as seen in FIG. 2 under the urging of the spring 94 until the piston 78 abuts a portion of the rear wall within the cavity 80 to define an extreme left position for the piston 78.

The clutch 76 further includes a first plurality of friction rings 98 disposed generally concentrically relative to the input shaft 64 and mounted in spaced-apart relation along the rear portion 68 of the carrier 60. A second plurality of friction rings 100 also disposed concentrically relative to the input shaft 64 is mounted in spaced-apart relation along a collar 102 joined to the left side of the output sun gear 62. The friction rings 98 engage with the friction rings 100 to provide engagement of the clutch 76 when the arrangement of rings 98 and 100 is compressed by movement of the piston 78 to the right as seen in FIG. 1 against the restraint of the spring 94. Disengagement of the friction rings 98 from the friction rings 100 and thus disengagement of the clutch 76 occurs when the absence of pressurized hydraulic fluid in the cavity 80 allows the spring 94 to move to the left and to the position shown in FIG. 2. Thus, application of pressurized hydraulic fluid from the source 88 to the passage 84 and the passage 82 and thus to the cavity 80 provides engagement of the clutch 76 to couple the carrier 60 to the input shaft 64 via the output sun gear 62 and its included collar 102. Upon removal of the pressurized hydraulic fluid from the cavity 80, either intentionally or by accident such as where the engine stalls or cannot be started, the spring 94 automatically provides disengagement of the clutch 76 by forcing the piston 78 to the left as seen in FIG. 2.

The low brake housing 86 is mounted to a portion of the housing 46 for the transmission 10 so as to remain stationary. Rotation of the rear portion 68 of the carrier 60 relative to the low brake housing 86 is provided by a bearing 108 and a thrust washer 110. The low brake housing 86 partially contains a clutch 112 capable of selectively coupling the carrier 60 to the low brake housing 86. The clutch 112 includes a generally ring-shaped piston 114 received within a conforming cavity 116 in the low brake housing 86. The cavity 116 is coupled via a passage 118 to the passage 84 adjacent the source 88 of pressurized hydraulic fluid. Inner and outer portions of the piston 114 are sealed to the adjacent walls of the cavity 116 by seals 120 and 122 respectively to seal the cavity 116.

The clutch 112 further includes a first plurality of friction rings 124 concentrically disposed relative to the input shaft 64 and mounted in spaced-apart relation along an inner wall of the low brake housing 86. A second plurality of friction rings 126 is concentrically disposed relative to the input shaft 64 and is mounted in spaced-apart relation along the rear portion 68 of the carrier 60 so as to be interleaved with the friction rings 124. The arrangement of friction rings 124 and 126 is sandwiched by a pair of pressure rings 128 and 130 at the left and right sides thereof respectively. The pressure ring 130 is engaged by the left side of a ring-shaped spring 132 disposed within the low brake housing 86 and having a right side thereof abutting a stop ring 134 mounted within the inner wall of the low brake housing 86. The spring 132, which comprises a Belleville spring in the present example, tends to force the pressure ring 130 to the left as seen in FIG. 2. In the absence of pressurized hydraulic fluid in the cavity 116, the piston 114 remains in the position shown in FIG. 2 with the pressure ring 128 abutting a rim 136 within the interior wall of the low brake housing 86. The tendency of the pressure ring 130 to move to the left and the stationary positioning of the pressure ring 128 against the rim 136 compresses the arrangement of friction rings 124 and 126 sandwiched therebetween so as to engage the clutch 112 and thereby couple the carrier 60 to the stationary low brake housing 86. Upon the application of pressurized hydraulic fluid to the cavity 116, the piston 114 moves to the right as seen in FIG. 2 causing an element 138 which is attached thereto and which abuts the pressure ring 130 to push the pressure ring 130 to the right as seen in FIG. 2 against the resistance of the spring 132 to decompress the arrangement of friction rings 124 and 126 until it is stopped by a stop ring 139 and thereby disengage the clutch 112.

It will be seen that in the planetary section 48 the clutches 76 and 112 are respectively engaged and disengaged by the application of pressurized hydraulic fluid from the source 88 to provide the direct drive condition in which the traction clutch shaft 18 is coupled through the input sun gear 50, the planet gear arrangement 54 and the output sun gear 62 to the input shaft 64. In the direct drive condition the carrier 60 rotates with the traction clutch shaft 18 and the input shaft 64. In the event the pressurized hydraulic fluid is removed either intentionally or by accident, the planetary section 48 automatically returns to the underdrive condition in which the clutch 112 is engaged to clamp the carrier 60 to the stationary low brake housing 86 and the clutch 76 is disengaged to free the carrier 60 from the output sun gear 62 and the input shaft 64 on which the gear is mounted. This action takes place automatically by virtue of the springs 132 and 94. In the event the engine stalls or cannot be started, the absence of pressurized hydraulic fluid keeps the planetary section 48 in the underdrive condition. With the carrier 60 safely clamped to the stationary low brake housing 86, the vehicle can be towed to start without danger of the carrier 60 rotating at a relatively high speed and possibly burning out the bearings as could be the case where the planetary section is not coupled by either the clutch 76 or the clutch 112.

The end of the input shaft 64 opposite the planetary section 48 is splined to the right-hand end of a top shaft 140 having an axis of elongation coincident with that of the input shaft 64. The top shaft 140 is rotatably mounted within the housing 46 by an arrangement of roller bearings 142 and 144 and a needle bearing 145. Concentrically mounted about the input shaft 64 for rotation relative thereto is a low-reverse drive shaft 146 which has the right-hand end thereof rotatably mounted on the housing 46 by roller bearings 148 and the left-hand end thereof rotatably mounted within the housing 46 by roller bearings 150. The outer periphery of the low-reverse drive shaft 146 between the bearings 148 and 150 forms an elongated gear 152 having fourteen teeth. The left-hand end of the low-reverse drive shaft 146 terminates in a gear 154 of greater diameter than the gear 152 and having 29 teeth.

The gear 154 at the left-hand end of the low-reverse drive shaft 146 forms one of a first plurality of four different gears 154, 156, 158 and 160 concentrically disposed about the top shaft 140 for rotation relative thereto in spaced-apart relation along the length of the top shaft 140. The gears 156, 158 and 160 have twenty-four teeth, nineteen teeth and fifteen teeth respectively. The gears 154, 156, 158 and 160 permanently mesh with four different gears 162, 164, 166, and 168 formed at the outer periphery of a hollow counter shaft 170 rotatably mounted about the outside of a differential drive shaft 172 by bearings 174 and 176. The gears 162, 164, 166 and 168 have twenty-six teeth, twenty-nine teeth, thirty-three teeth and thirty-six teeth respectively. The differential drive shaft 172, which is comprised of two different splined-together shafts in the present example, is rotatably mounted within the housing 46 by roller bearings 178 at the left-hand end thereof, roller bearings 180 at a central portion thereof and roller bearings 182 at a right-hand portion thereof.

Either of the gears 154 and 156 may be coupled to the top shaft 140 by a synchronizer pair 184. Either of the gears 158 and 160 may be coupled to the top shaft 140 by a second synchronizer pair 186. The synchronizer pairs 184 and 186 are of like construction and are of the cone type. Each pair of synchronizers includes an axially movable shift collar 188 or 186 the inner surface of which includes a plurality of splines 190 slidably disposed between a set of splines 192 on the outer surface of a base hub 194 splined to the outer surface of the top shaft 140. Each of the synchronizer pairs 184 and 186 also includes an opposite pair of blocker rings 196 and 198 having splined outer peripheries and disposed between the base hub 194 and an opposite pair of drive collars 200 and 202 respectively. In the case of the synchronizer pair 184 the drive collar 200 is mounted on the gear 156 and the drive collar 202 is mounted on the gear 154. In the case of the synchronizer pair 186 the drive collar 200 is mounted on the gear 160 and the drive collar 202 is mounted on the gear 158.

The synchronizer pair 184 and 186 operate in well-known fashion to couple either of the two associated gears to the top shaft 140. For example, if the gear 156 is to be coupled to the top shaft 140, the shift collar 188 of the synchronizer pair 184 is moved to the left as seen in FIG. 1. This causes the slider 192 to move against the blocker ring 196 to begin engagement of the blocker ring 196 to the drive collar 200. The splines 190 at the underside of the shift collar 188 contact the splines at the outer periphery of the blocker ring 196 until the speed of the blocker ring 196 is at least equal to that of the drive collar 200, whereupon a slight shifting of the splines of the blocker ring 196 relative to the splines 190 at the underside of the shift collar takes place to allow the splines 190 to pass through the blocker ring splines and engage the splines at the outer periphery of the drive collar 200. Uncoupling of the gear 156 from the top shaft 140 is accomplished by axial movement of the shift collar 188 back into the neutral position as shown in FIG. 1. Axial movement of the shift collar 188 of the synchronizer pair 184 results in synchronous coupling of the gear 154 and the included low-reverse drive shaft 196 to the top shaft 140. The synchronizer pair 186 can be operated in like fashion to couple the gear 160 or the gear 158 to the top shaft 140.

The gears 154, 156, 158 and 160 surrounding the top shaft 140 and the gears 162, 164, 166 and 168 at the outer periphery of the counter shaft 170 provide four relatively closely spaced gear ratios or speeds between the top shaft 140 and the counter shaft 170 which are synchronously selected. The four different pairs of gears are utilized within a low range (speeds 1-4) or a high range (speeds 5-8) depending upon the manner in which the counter shaft 170 is coupled to the differential drive shaft 172.

The low range (speeds 1-4) is chosen by a low range shift collar 204 the inner surface of which is splined for engagement with the splined outer surface of a base ring 206 mounted on the outer surface of the differential drive shaft 172. The low range shift collar 204 is disposed between and engageable with a low range driven gear 208 and a driven reversing gear 210. The low range driven gear 208 has a set of splines 212, and the driven reversing gear 210 has a set of splines 214.

Axial movement of the low range shift collar 204 of the left as seen in FIG. 2 results in engagement of the splines at the underside thereof with the splines 212 so as to couple the low range driven gear 208 to the differential drive shaft 172. The low range driven gear 208 which has forty-three teeth meshes with the elongated gear 152 at the outer surface of the low-reverse drive shaft 146. Since the low-reverse drive shaft 146 is coupled to the counter shaft 170 via the gear 154 and the gear 162, driving of the counter shaft 170 by one of the three gears 160, 158 and 156 coupled by one of the synchronizer pairs to the top shaft 140 results in driving of the differential drive shaft 172 via the low-reverse drive shaft 146 and the low range driven gear 208. The synchronizer pair 184 can also be used to couple the low-reverse drive shaft 146 and the included gear 154 directly to the top shaft 140. This coupling defines low range with gears 160, 158, 156 and 154 defining speeds 1-4 respectively.

Speeds 1–4 can also be used in a reverse direction by axially moving the low range shift collar 204 to the right as seen in FIG. 2. This results in eventual engagement of the splines at the underside of the collar 204 with the splines 214 of the driven reversing gear 210, thereby coupling the gear 210 to the differential drive shaft 172. The driven reversing gear 210 which has twenty-eight teeth meshes with an intermediate reversing gear 216 mounted for rotation via roller bearings 218 to a shaft 220 which is coupled to the transmission housing 46. The intermediate reversing gear 216 which has twenty-five teeth also meshes with the elongated gear 152 at the outer periphery of the low-reverse drive shaft 146. For clarity of illustration the intermediate reversing gear 216 is shown in FIG. 2 as being positioned above the input shaft 64. In reality, however, the gear 216 is disposed to the side of and slightly below the input shaft 64 so that it can mesh with the driven reversing gear 210.

With the low range shift collar 204 axially moved to the right so as to engage the driven reversing gear 210, the differential drive shaft 172 is coupled through the gear 210, the intermediate reversing gear 216 and the low-reverse drive shaft 146 to the counter shaft 170. The selected one of four different speeds provided to the counter shaft 170 by one of the gears 160, 158, 156 and 154 is provided to the differential drive shaft 172 but in the reverse direction due to the idler gear effect of the intermediate reversing gear 216.

Whereas the low range (speeds 1–4) is provided by coupling the counter shaft 170 to the differential drive shaft 172 through the low-reverse drive shaft 146 and the low range driven gear 208, the high range (speeds 5–8) is provided by coupling the counter shaft 170 directly to the differential drive shaft 172. This is provided by a high range shift collar 222 having a splined inner surface engaged with a splined outer surface of the counter shaft 170 to the left of the gear 168. Axial movement of the high range shift collar 222 to the left as seen in FIG. 2 results in eventual engagement of the splines at the underside of the collar 222 with a set of splines 224 at the outer surface of a drive collar 226 mounted on the outer surface of the differential drive shaft 172.

Figure 4:
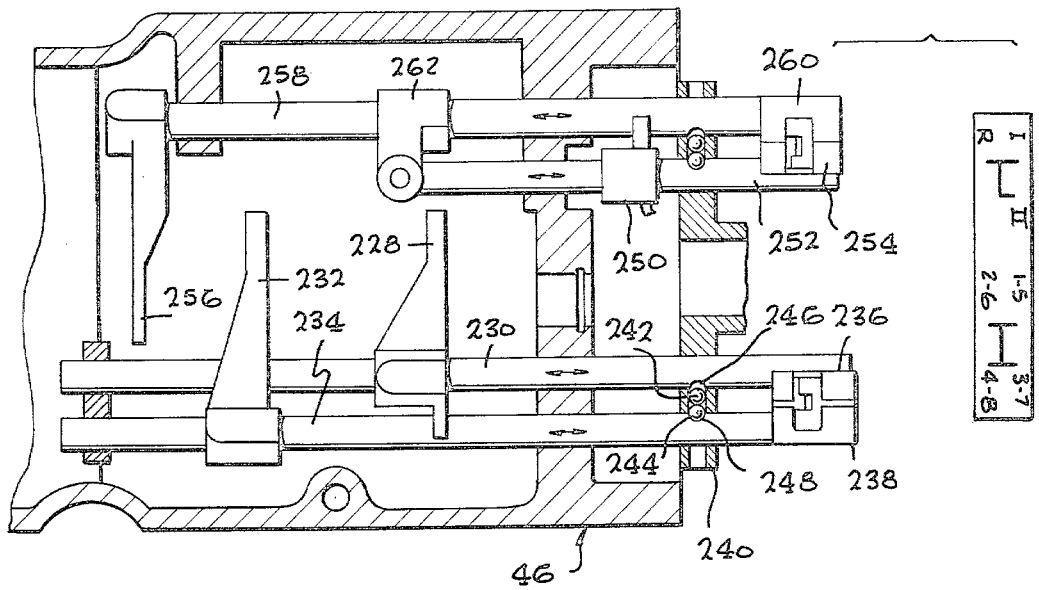
FIG. 4 is a top sectional view of a shifting mechanism for shifting the transmission of FIG. 1.

FIG. 4 shows a shifting mechanism for operating the synchronizer pairs 184 and 186, the low range shift collar 204 and the high range shift collar 222. FIG. 4 is a top view of the shifting mechanism looking down into the transmission housing 46. The shift collar 188 of the synchronizer pair 184 is engaged by a conventional shifting fork 228 mounted on a shifter rail 230. The shifter rail 230 is mounted within the transmission housing 46 for axial movement. In like fashion the synchronizer pair 186 is coupled to be operated by a shifting fork 232 mounted on a shifter rail 234 which is axially slidable within the transmission housing 46. The right-hand end of the shifter rails 230 and 234 as seen in FIG. 4 are coupled to brackets 236 and 238 respectively for engagement by a conventional shift lever which is not shown in FIG. 4. The shifter rails 230 and 234 pass through apertures in a forward wall 240 of the housing 46 which has an aperture therein extending between the rails 230 and 234 and containing balls 242 and 244. Each of the shafts 230 and 234 is provided with a recess 246 and 248 respectively therein, and the spacing between the rails 230 and 234 is such that when one of the balls 242, 244 is in one of the recesses 246, 248, the other rail is free to undergo axial movement. This arrangement prevents axial movement of one of the rails 230, 234 when the other is moved out of the neutral position by the shift lever.

The low range shift collar 204 is moved axially by a shifting fork 250 which is shown partly broken off in FIG. 4 for clarity of illustration. The shifting fork 250 is mounted on a shifter rail 252 mounted for axial movement within the housing 46 and terminating at the right-hand end thereof in a bracket 254. The high range shift collar 222 is axially moved by a shifting fork 256 mounted on a shifter rail 258 which is mounted for axial movement within the housing 46 and which terminates in a bracket 260 at the right-hand end thereof. The brackets 254 and 260 are engaged by a conventional shifting lever which is not shown in FIG. 4. The shifter rails 252 and 258 are provided with a ball and recess arrangement similar to that described in connection with the rails 230 and 234 to prevent movement of one of the rails 252, 258 out of the neutral position when the other rail is out of the neutral position. The left-hand end of the rail 252 is coupled to an intermediate portion of the rail 258 via a safety bracket 262 which prevents the engine from being started with the transmission in gear.

The right-hand portion of FIG. 4 depicts the gear shift pattern used with the shifting mechanism of FIG. 4. The gear shift pattern depicts the different speed ranges and speeds for the two different conventional shifting levers which couple to the various brackets 236, 238, 254 and 260. The shifting lever which engages the brackets 254 and 260 can be moved between three different positions designated R, I and II. When the shifting lever is moved into the R position, the bracket 254 and the included shifter rail 252 are moved to the right as viewed in FIG. 4. This causes shifting fork 250 to move to the right, resulting in axial movement to the low range shift collar 204 to the right as viewed in FIG. 2 to place the transmission in the reverse range. If the shifting lever is now moved from R up to I representing the low range, the bracket 254 is moved to the left as viewed in FIG. 4 to such an extent that the shifter rail 252 is moved to the left through the neutral position to an extreme left-hand position. This results in the shifting fork 250 moving the low range shift collar 204 to the extreme left position as viewed in FIG. 1 so as to engage the splines 212 on the low range driven gear 208 to thereby place the transmission in the low range (I). If the shifting lever is now returned to a point half way between I and R, the shifter rail 252 is returned to the neutral position with the recess therein disposed adjacent the balls. If the shifting lever is now moved to the right as viewed on the gear shift pattern the bottom end of the shifting lever disengages from the bracket 254 and engages the bracket 260 at the end of the shifter rail 258. As the shifting lever reaches the right-hand extreme and is then moved upwardly into position II, the two balls are forced downwardly so that the lower one engages the recess in the shifter rail 252 as the shifter rail 258 is moved out of the neutral position and to the left as viewed in FIG. 2. The resulting movement of the shifting fork 256 moves the high range shift collar 222 axially to the left as viewed in FIG. 2 so as to engage the splines 224 on the drive collar 226, thereby shifting the transmission into the high range (II).

The other portion of the gear shift pattern depicts four different positions designated 1–5, 2–6, 3–7 and 4–8. The conventional shifting lever utilized with this portion of the pattern engages either the bracket 238 at the end of the shifter rail 234 or the bracket 236 at the end of the shifter rail 230. When the shifting lever is moved to the left of the "H" shaped pattern, it engages the bracket 238 in preparation for movement of the shifter rail 234 and its includes shifting fork 232. If the shifting lever is moved up to the 1-5 position, the shifter rail 234 is moved to the left as viewed in FIG. 4, causing the synchronizer pair 186 to couple the gear 160 to the top shaft 140. If the transmission is in the low range (I), speed 1 is provided. If the transmission is in the high range (II), speed 5 is provided. Movement of the shifting lever down from the 1-5 position to the 2-6 position moves the shifter rail 234 to the right through the neutral position to a right-hand extreme in which the shifting fork 232 causes the synchronizer pair 186 to couple the gear 158 to the top shaft 140. This produces speed 2 or speed 6 depending on whether the transmission is in the low or high range respectively. Movement of the shifting lever to the right-hand side of the "H" shaped pattern causes the shifting lever to leave the bracket 238 and engage the bracket 236 at the end of the shifter rail 230. If the shifting lever is then pushed upwardly into the 3-7 position, the shifter rail 230 and its included shifting fork 228 are moved to the left, causing the synchronizer pair 184 which is coupled to the shifting fork 228 to couple the gear 156 to the top shaft 140. This produces speeds 3 or 7 depending on whether the transmission is in the low or high range respectively. If the shifting lever is now moved downwardly into the 4-8 position, the shifter rail 230 is moved through the neutral position to the extreme right position in which the shifting fork 228 causes the synchronizer pair 184 to couple the gear 154 to the top shaft 140. This produces speed 4 or speed 8 depending on whether the transmission is in the low or high range. As previously noted, when the transmission is in the reverse (R) range, speeds 1, 2, 3 or 4 can be selected by appropriate positioning of the other shifting lever.

Referring again to FIG. 2, it was previously noted that the flywheel 12 of the transmission 10 drives the power takeoff drive shaft 22 through the power takeoff hub 20. The end of the power takeoff drive shaft 22 opposite the power takeoff hub 20 terminates in a twenty-seven tooth drive gear 264 which meshes with a sixty-five tooth driven gear 265. The gear 265 surrounds and is concentrically disposed relative to a power takeoff shaft 268 which is mounted for rotation about an axis of elongation generally parallel to that of the differential drive shaft 172, the input shaft 64 and the traction clutch shaft 18. The power takeoff shaft 268 is shown as being broken just to the left of the gear 265 in FIG. 2 for clarity of illustration. The left-hand portion of the shaft 268 which is shown in a lowered position so as not to obscure the illustration of certain other parts within the transmission is in actuality continuous with the right-hand end of the shaft 268 as seen in FIG. 1.

The driven gear 265 which surrounds the power takeoff shaft 268 and which is driven by the power takeoff drive shaft 22 via the drive gear 264 is selectively coupled to the power takeoff shaft 268 by a clutch 270. The gear 265 is mounted on the outside of the rotatable drum 272 mounted for the rotation about the power takeoff shaft 268 and having an inner, generally cylindrical portion 274 immediately outside of the power takeoff shaft 268 and an outer, generally cylindrical portion 276 concentrically disposed relative to and spaced apart from the inner, generally cylindrical portion 274. The inner and outer portions 274 and 276 are joined together at one end of the drum 272 by a hollow, disk-shaped portion 278. A fixed hub 280 is fixedly mounted on the power takeoff shaft 268 and includes a generally cylindrical portion 282 extending into the region between the inner and outer generally cylindrical portions 274 and 276 of the rotatable hub 272.

The clutch 270 includes a hollow, generally ring-shaped piston 284 disposed within a cavity 286 formed by the hollow, disk-shaped portion 278 in conjunction with adjacent parts of the cylindrical portions 274 and 276 of the rotatable drum 272. The cavity 286 is coupled via a passage 288 of a source of pressurized hydraulic fluid. A pair of seals 292 and 294 seal the piston 284 to the inner and outer cylindrical portions 274 and 276 respectively. Application of pressurized hydraulic fluid via the passage 288 to the cavity 286 causes the piston 284 to move to the left as viewed in FIG. 2 against the resistance of a coil spring 296 disposed on the inside of the generally cylindrical portion 282 of the fixed hub 280 and extending between the piston 284 and a stop ring 298 mounted on the inner, generally cylindrical portion 274 of the rotatable drum 272. Leftward movement of the piston 284 compresses an arrangement of friction rings against a pressure ring 300 which abuts a stop ring 302 mounted on the inside surface of the outer, generally cylindrical portion 276 of the rotatable drum 272. The arrangement of friction rings includes a first plurality of friction rings 304 concentrically disposed relative to the power takeoff shaft 268 and mounted in spaced-apart relation along the inner surface of the outer, generally cylindrical portion 276 of the rotatable hug 272. A second plurality of friction rings 306 also concentrically disposed relative to the power takeoff shaft 268 is mounted in spaced-apart relation along the outer surface of the generally cylindrical portion 282 of the fixed hub 280 so as to be interleaved with the first plurality of friction rings 304.

As previously noted, application of pressurized hydraulic fluid to the cavity 286 results in movement of the piston 284 to the left as viewed in FIG. 2 against the resistance of the coil spring 296 to compress the arrangement of friction rings 304 and 306 against the pressure ring 300 and the stop ring 302. This results in engagement of the clutch 270 to drive the power takeoff shaft 268 in response to driving of the gear 265. When the pressurized hydraulic fluid is removed either intentionally or by accident, the spring 296 pushes the piston 284 to the right as viewed in FIG. 2 to decompress the arrangement of friction rings 304 and 306 and thereby disengage the power takeoff shaft 268 from the gear 265.

A second passage 290 is also coupled via a passage 307 to a cavity 308 receiving a ring-shaped piston 309 within a portion of the transmission housing 46. Application of pressurized hydraulic fluid to the cavity 308 pushes the piston 309 to the right as seen in FIG. 2 to press the friction ring 310 secured to the housing 46 against the friction disk 311 mounted on the power takeoff shaft 268 to brake the shaft 268. Engagement of the friction ring 310 with the friction disk 311 is aided by a pressure ring 312 secured to the housing 46 on the opposite side of the friction disk 311 from the friction ring 310.

The differential drive shaft 172 has a twenty-one tooth drive gear 314 mounted on the right-hand end thereof adjacent the roller bearing 182. The gear 314 meshes with a twenty-three tooth intermediate gear 316 formed on the outer surface of a hollow front wheel drive coupling shaft 318 surrounding and rotatable relative to the power takeoff shaft 268. The shaft 318 is mounted for rotation by roller bearings 320 and 322. A thirty tooth intermediate gear 324 which is mounted on the shaft 318 meshes with a forty-nine tooth driven gear 326 concentrically disposed for rotation about the outer surface of a front wheel drive shaft 328. The front wheel drive shaft 328 is mounted for rotation by roller bearings 330 and 332. The gear 326 has a hollow cylindrical hub 334 mounted thereon so as to be concentric with the front wheel drive shaft 328 and so as to mount a plurality of friction rings 336 in spaced-apart relation along the length thereof. The friction rings 336 which form a part of a front wheel drive clutch 338 are interleaved with a second plurality of friction rings 340 mounted in spaced-apart relation along an inner surface of a hollow, generally cylindrical drum 342 mounted on the outer surface of the front wheel drive shaft 328. The hollow interior of the drum 342 defines a cavity 344 in which resides a hollow, generally cylindrical piston 346. The piston 346 engages a rim 348 which extends around the outside of the friction rings 336 and 340 and engages a pressure ring 350 at the opposite side of the arrangement of friction rings 336 and 340 from the piston 346. A generally ring-shaped spring 352 extends between the pressure ring 350 and a stop ring 354 attached to the inner surface of the outer portion of the drum 342. A second pressure ring 356 disposed on the opposite side of the arrangement of friction rings 336 and 340 from the pressure ring 350 and adjacent the piston 346 abuts a second stop ring 358 mounted on the inner surface of the outer portion of the drum 342.

A valve 360 for controlling the application of pressurized hydraulic fluid to the cavity 344 includes a spool 362 having a circumferential groove 364 therein. When the spool 362 is moved to the right as seen in FIG. 2 by an electrically operated solenoid assembly 366 against the resistance of a spring 368, pressurized hydraulic fluid at a passage 370 communicates via the groove 364 in the spool 362 to a passage 372 where it communicates with a passage 374 to a passage 376 extending along the central axis of the front wheel drive shaft 328. The passage 376 communicates with the cavity 344 via a passage 378 radially disposed within the shaft 328 and a connecting passage 380 in the hub 342.

When the solenoid assembly 366 is actuated so as to provide pressurized hydraulic fluid to the cavity 344, the piston 346 moves to the left as seen in FIG. 2 so as to push the pressure ring 350 to the left and away from the arrangement of friction rings 336 and 340. This causes the friction rings 336 to disengage from the friction rings 340 so that driving of the gear 326 does not drive the front wheel drive shaft 328. However, upon removal of the pressurized hydraulic fluid, either intentionally or accidentally, the spring 352 pushes the pressure ring 350 to the right as seen in FIG. 2 so as to compress the arrangement of friction rings 336 and 340 against the pressure ring 356 and the stop ring 358 to provide engagement of the clutch 338 to drive the front wheel drive shaft 328 in response to driving of the gear 326. The front wheel drive shaft 328 is coupled to the front wheels of the tractor through an appropriate universal joint and axle arrangement. The spring 352 insures that the front wheels are coupled to the differential drive shaft 172 of the transmission in the absence of pressurized hydraulic fluid to the clutch 338. This feature is particularly useful in situations such as where the tractor is being driven in reverse up a hill and the engine stalls. In such situations the front wheels provide most of the driving or braking traction and it is therefore important that they remain coupled to the transmission. The spring 352, which in the present example comprises a Belleville spring, insures that the clutch 338 remains engaged even in the absence of pressurized hydraulic fluid upon stalling of the engine so that the front wheels remain coupled to the transmission.

While the invention has been particularly shown and described with reference to a preferred embodiment thereof, it will be understood by those skilled in the art that various changes in form and details may be made therein without departing from the spirit and scope of the invention.

What is claimed is:

1. A transmission comprising the combination of a first shaft adapted to be rotatably driven, a first plurality of gears surrounding the first shaft, at least one synchronizer pair coupled to the first shaft and operative to couple a selected one of the first plurality of gears to the first shaft, a second shaft having an outer periphery formed into a second plurality of gears, each of the second plurality of gears meshing with a different one of the first plurality of gears, a third shaft adapted to rotatably drive a load, means for selectively coupling the second shaft directly to the third shaft, and means for selectively coupling the second shaft to the third shaft through a gear reduction arrangement.

2. The invention set forth in claim 1, wherein the second shaft has a hollow interior and the third shaft is rotatably mounted within the hollow interior of the second shaft.

3. The invention set forth in claim 1, wherein the means for selectively coupling the second shaft to the third shaft through a gear reduction arrangement includes a low range driven gear surrounding the third shaft and meshing with one of the first plurality of gears and means for selectively coupling the low range driven gear to the third shaft.

4. The invention set forth in claim 1, wherein the first plurality of gears comprises first, second, third and fourth gears spaced-apart along the length of the first shaft and the at least one synchronizer pair includes a first synchronizer pair surrounding the first shaft between the first and second gears and operative to selectively couple the first or the second gear to the first shaft and a second synchronizer pair surrounding the first shaft between the third and fourth gears and operative to selectively couple the third or the fourth gear to the first shaft.

5. A transmission comprising the combination of a top shaft mounted to be rotatably driven, first, second, third and fourth gears concentrically mounted for rotation about the top shaft, a first synchronizer pair fixedly mounted on the top shaft between the first and second gears and operative to selectively engage either of the first and second gears, a second synchronizer pair fixedly mounted on the top shaft between the third and fourth gears and operative to selectively engage either of the third and fourth gears, a differential drive shaft rotatably mounted generally parallel to the top shaft, a counter shaft having a hollow interior receiving the differential drive shaft therein, the counter shaft being rotatable about the differential drive shaft and having an outer periphery defining fifth, sixth, seventh and eighth gears meshing with the first, second, third and fourth gears respectively, means for selectively coupling the counter shaft to the differential drive shaft, a ninth gear concentrically mounted for rotation about the differential drive shaft and meshing with the fourth gear, and means for selectively coupling the ninth gear to the differential drive shaft.

6. The invention set forth in claim 5, further including a rotatably mounted tenth gear meshing with the fourth gear, an eleventh gear concentrically mounted for rotation about the differential drive shaft, and means for selectively coupling the eleventh gear to the differential drive shaft.

7. The invention set forth in claim 5, wherein the differential drive shaft has a first set of splines thereon, the means for selectively coupling the counter shaft to the differential drive shaft includes a first collar splined to the counter shaft and axially movable to selectively engage the first set of splines on the differential drive shaft, the ninth gear has a second set of splines thereon and the means for selectively coupling the ninth gear to the differential drive shaft includes a second collar splined to the differential drive shaft and axially movable to selectively engage the second set of splines on the ninth gear.

8. The invention set forth in claim 5, wherein each of the first and second synchronizer pairs includes a base ring splined to the top shaft, a shift collar surrounding and splined to and axially shiftable relative to the base ring, a pair of splined drive collars disposed on oppostie sides of the shift collar and coupled to adjacent ones of the first, second, third and fourth gears, and a pair of blocker rings disposed on opposite sides of the shift collar between the shift collar and the pair of drive collars, each of the blocker rings being operative in response to axial movement of the shift collar in the direction thereof to engage an adjacent one of the pair of splined drive collars and to permit further axial movement of the shift collar toward and eventual engagement of the splines of the adjacent ones of the pair of spline drive collars by the shift collar when there is no substantial relative rotational movement between the shift collar and the adjacent one of the pair of splined drive collars.

9. The invention set forth in claim 5, wherein the first, second, third and fourth gears have fifteen, nineteen, twenty-four and twenty-nine teeth respectively, and the fifth, sixth, seventh and eighth gears have thirty-six, thirty-three, twenty-nine and twenty-six teeth respectively.

10. The invention set forth in claim 9, wherein the ninth gear has forty-three teeth and meshes with a portion of the fourth gear having fourteen teeth.

11. The invention set forth in claim 5, further including a planetary gear arrangement coupled to the top shaft and including a stationary housing, a carrier surrounding and rotatable about the top shaft, a first clutch disposed between the stationary housing and the carrier and operative to couple the carrier to the stationary housing when engaged, a planet and sun gear arrangement mounted on the carrier and the top shaft, and a second clutch disposed between the carrier and the top shaft and operative to couple the carrier to the top shaft when engaged.

12. The invention set forth in claim 11, wherein the first clutch includes a fluid pressure operated piston arrangement for causing disengagement thereof and means for resiliently biasing the first clutch into engagement in the absence of fluid pressure to the piston arrangement.

13. The invention set forth in claim 12, wherein the second clutch includes a fluid pressure operated piston arrangement for causing engagement thereof, and means for resiliently biasing the second clutch into disengagement in the absence of fluid pressure to the piston arrangement.

14. The invention set forth in claim 5, further including a front wheel drive shaft, a tenth gear concentrically mounted for rotation about the front wheel drive shaft, means for coupling the tenth gear to be driven by the differential drive shaft, and a clutch disposed between the tenth gear and the front wheel drive shaft and operative to couple the tenth gear to the front wheel drive shaft when engaged.

15. The invention set forth in claim 14, further including a power takeoff shaft disposed generally parallel to the differential drive shaft, and wherein the means for coupling the tenth gear to be driven by the differential drive shaft includes an eleventh gear mounted on the differential drive shaft and a front wheel drive coupling shaft concentrically mounted for rotation about the power takeoff shaft, the outer periphery of the front wheel drive coupling shaft defining a twelfth gear meshing with the eleventh gear and a thirteenth gear meshing with the tenth gear.

16. The invention set forth in claim 14, wherein the clutch includes a fluid pressure operated piston arrangement for causing disengagement thereof and means for resiliently biasing the clutch into engagement in the absence of fluid pressure to the piston arrangement.

* * * * *

UNITED STATES PATENT AND TRADEMARK OFFICE
CERTIFICATE OF CORRECTION

PATENT NO. : 4,318,305
DATED : March 9, 1982
INVENTOR(S) : Peter D. Wetrich et al It is certified that error appears in the above-identified patent and that said Letters Patent are hereby corrected as shown below:

Column 2, line 26, after "a" and before "engaged", "plurality" should read --partially--. Column 8, line 50, after "204", "of" should read --to--. Column 10, line 40, after "is" and before "to", "noved" should read --moved--. Column 12, line 12, after "288" and before "a", "of" (first occurrence) should read --to--.

Signed and Sealed this

Twenty-fifth Day of May 1982

[SEAL]

Attest:

Attesting Officer

GERALD J. MOSSINGHOFF

Commissioner of Patents and Trademarks